July 2, 1963
R. E. BUCK
3,096,098
CHUCK JAW CONSTRUCTION
Filed April 13, 1961
2 Sheets-Sheet 1
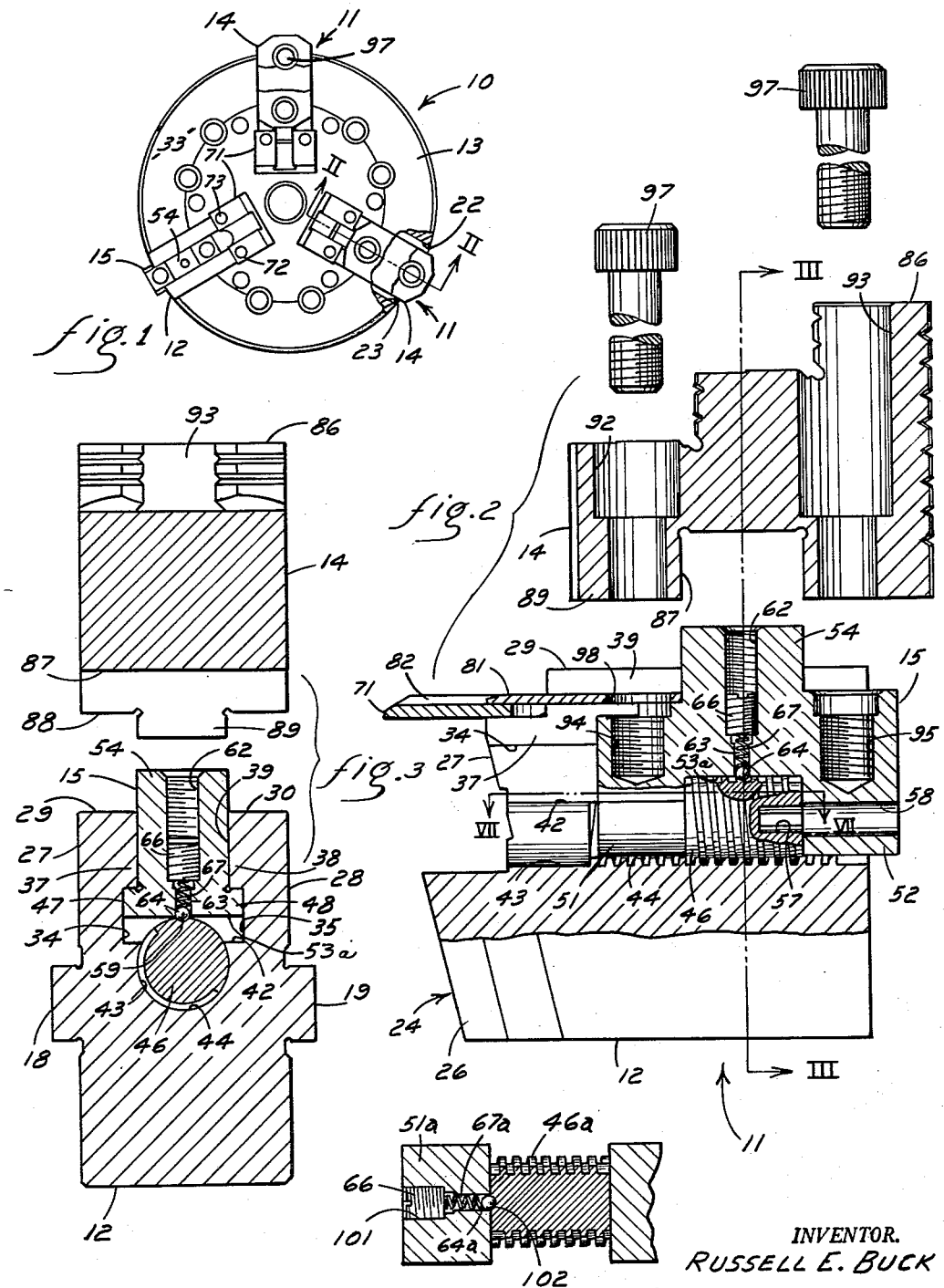
INVENTOR.
RUSSELL E. BUCK
BY
Woodhams Blanchard and Flynn
ATTORNEYS

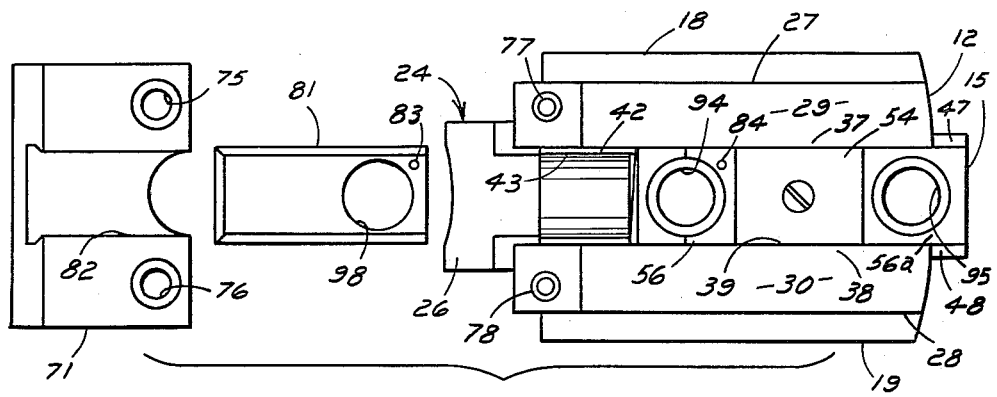
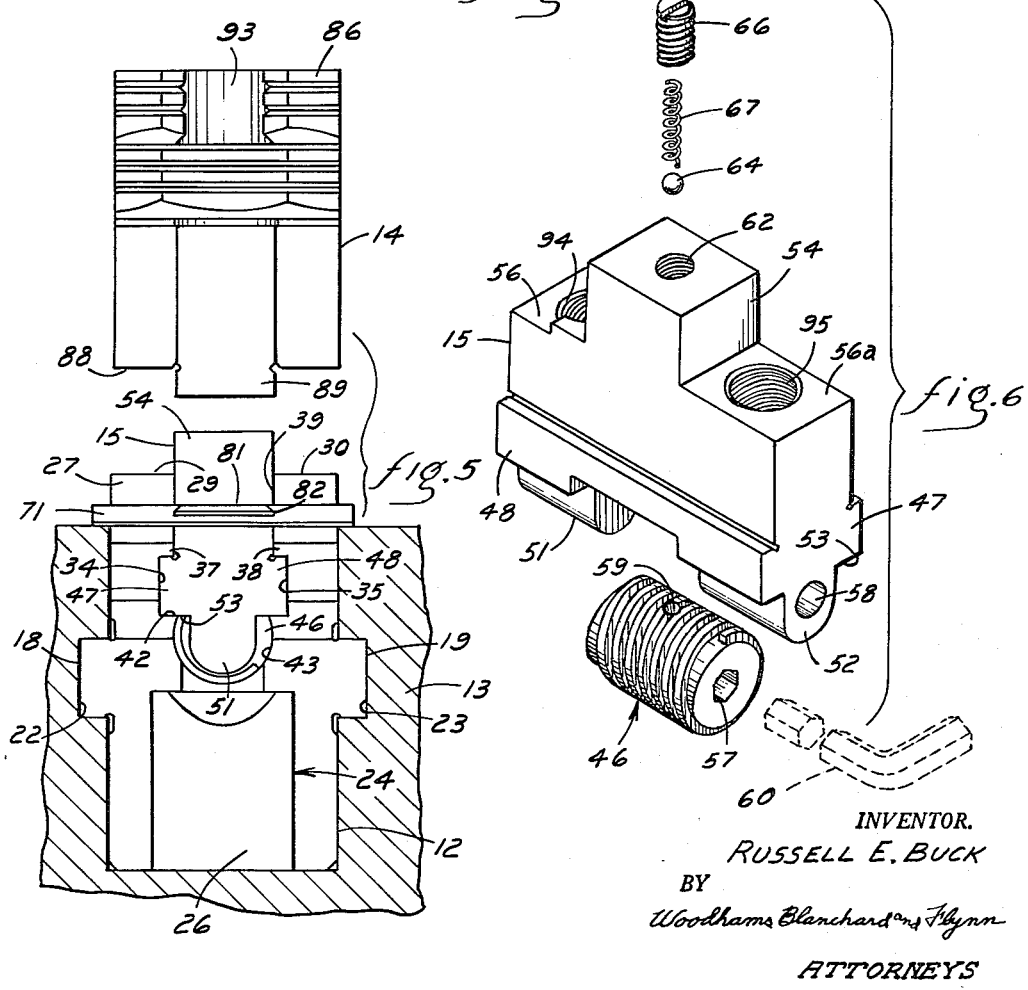

United States Patent Office 3,096,098
Patented July 2, 1963

3,096,098
CHUCK JAW CONSTRUCTION
Russell E. Buck, Scotts, Mich., assignor to Buck Tool Company, Kalamazoo, Mich., a corporation of Michigan
Filed Apr. 13, 1961, Ser. No. 102,847
7 Claims. (Cl. 279—123)

This invention relates in general to a chuck assembly and, more particularly, to an improved jaw construction for use with a center-controlled power chuck.

The advantages of a chuck having jaws which can be speedily and accurately adjusted in response to changing work requirements are obvious. Generally speaking, this problem has been greatly reduced for certain types of work by the conventional, universal chuck. However, the center-controlled power chucks which are presently in use, are not easily capable of the same speedy and accurate adjustment, particularly over the wide range of jaw openings, which can be achieved by the universal chuck.

In one conventional jaw construction for power chucks, the jaw and the jaw base have serrations along their opposing surfaces which are interengageable for the purpose of opposing relative lengthwise movement between the jaw and the jaw base. If the teeth formed by the serrations are strong enough to prevent a shearing thereof during the normal operation of the chuck, as they must be, then said teeth are often too large to permit small, lengthwise adjustments of the outer jaw with respect to the jaw base, hence the chuck. That is, the available positions of interlock between the teeth on the jaw base and the teeth on the jaw may be incapable of providing the desired precision for selecting the opening needed in the chuck jaws. More specifically, in one position of the teeth or serrations with respect to each other, the jaws may not open wide enough to receive the workpiece with ease. In the next adjacent position of the serrations with respect to each other, the jaws may not close sufficiently to grip firmly the workpiece.

In addition to this problem, it has been as a practical matter virtually impossible to cut the interlocking serrations in the jaw base and its outer jaw so that all of the teeth provided therebetween are in such interlocking engagement with each other as to share equally the shearing load between the jaw and jaw base during the work holding operation of the chuck. It has been found that even a few ten-thousandths of an inch of unnecessary clearance will cause a few of the serrations to be sufficiently out of line to carry the entire load of the outer jaw. Moreover, and of equal importance, it has been found that the variations in the serrations and the teeth therebetween produce inaccuracies in the various jaw positions. Thus, even though the outer jaws are concentrically positioned in one arrangement thereof upon the jaw bases, said jaws may be eccentrically disposed when they are moved into different, though corresponding, positions upon the jaw bases.

It will thus be apparent that the use of serrations between the outer jaw and the jaw base not only greatly limits the selection of relative positions between the outer jaw and jaw base, but actually prevents accurate, small variations in these relative positions. Furthermore, any change in position between the outer jaw and the jaw base necessitates substantial loosening of the interconnecting bolts so that the teeth on the outer jaw can be completely disengaged from the teeth on the jaw base, which is very time consuming.

Although many efforts have been made to provide mechanisms for effecting satisfactory jaw adjustments in power chucks, such attempts have, insofar as I am aware, been unsuccessful. In one such attempt to overcome the lack of satisfactory adjustability in the jaws of a power chuck, a screw member has been provided between adjacent surfaces of the jaw base and the work engaging jaw. However, in this arrangement the entire load applied to the outer jaw must be transferred through the screw and its threads to the jaw base and the chuck body. Moreover, this arrangement necessitates independent, guiding support of both the jaw base and the outer jaw within or upon the chuck body, which severely complicates the removal and replacement of a set of outer jaws.

It will be apparent that where heavy loads are applied to the chuck, the screw means located between the jaw base and the outer jaw will be subjected to excessive wear, whereby backlash and inaccuracy will develop in a relatively short period of time. Aside from the fact that this arrangement permits the movement of the jaw with respect to the jaw base in smaller increments, it is really no improvement over the existing power jaw constructions from the standpoint of saving time during a work changing operation.

Accordingly, a primary object of this invention has been the provision of a chuck jaw construction whereby the outer jaw can be quickly and easily adjusted with respect to its jaw base toward and away from the rotational axis of the chuck in small, accurate increments without weakening the strength of the chuck construction by comparison with existing chuck constructions of a similar type and without subjecting any part of the chuck jaw assembly to abnormal stresses which can lead to a failure in such part or produce excessive wear and the need for replacement.

A further object of this invention has been the provision of an improved, chuck jaw construction for a center-controlled, power chuck whereby the maximum amount of movement, hence effectiveness, of the chuck jaws during an opening and closing operation can be maintained for workpieces in a wide range of sizes, including any size within such range.

A further object of this invention has been the provision of a chuck jaw construction, as aforesaid, wherein the accuracy of a screw-type adjustment can be achieved while substantially relieving said screw from supporting and transferring the operating force applied to the chuck jaw by the chuck body.

A further object of this invention has been the provision of a chuck jaw construction, as aforesaid, which can be easily and quickly operated by any person capable of effecting adjustment in chuck jaws of the type presently in use, which is capable of trouble free operation for long periods of continuous use, which is arranged so that it can be adapted to various types of chuck bodies presently in use and which can be operated repeatedly with a degree of accuracy heretofore unavailable in many chucks, and particularly in power chucks.

Other objects and purposes of this invention will become apparent to persons familiar with this type of equipment upon reading the following specification and examining the accompanying drawings, in which:

FIGURE 1 is a broken axial end view of a power chuck having jaw assemblies embodying the invention.

FIGURE 2 is a partially exploded, sectional view of the chuck jaw assembly taken along the line II—II in FIGURE 1.

FIGURE 3 is a sectional view taken along the line III—III in FIGURE 2.

FIGURE 4 is an exploded, top plan view of the chuck jaw base with the outer jaw removed therefrom.

FIGURE 5 is a partially exploded, end view of said chuck jaw assembly as viewed from the inner end thereof.

FIGURE 6 is an exploded, perspective view of the key member in said chuck jaw assembly and parts associated therewith.

FIGURE 7 is a sectional view taken along the line

VII—VII in FIGURE 2 and showing an alternate construction.

For convenience in description, the terms "upper," "lower" and words of similar import will have reference to the chuck jaw assembly as appearing in FIGURES 2, 3 and 5. The terms "inner," "outer" and derivatives thereof will have reference to the geometric center of the chuck jaw assembly or the chuck body supporting same.

General Description

The objects and purposes of the invention, including those set forth above, have been met by providing a chuck jaw assembly including a jaw base which is slidably supported within a chuck body for radial movement with respect thereto. Said jaw base has a lengthwise channel in its upper surface which is defined by a pair of spaced, substantially parallel and upwardly extending walls. A key member is slidably and snugly supported within said slot and upon said walls for movement radially of the chuck body. Screw means is provided between the key member and the jaw base for effecting accurate lengthwise movement of the key member with respect to the jaw base in any amount within the full range of such movement and radially of the chuck body. The key member has a lug which extends above the upper surface of the jaw base, when the key is operably supported within said slot. Said lug is slidably receivable into a notch in the top jaw, which has downward projections slidably receivable between the two walls on the chuck base on opposite sides of the lug. Lock bolts are provided for connecting the top jaw to the key member and, at the same time, locking portions, such as horizontally extending flanges, of said upwardly extending walls between said top jaw and said key member, whereby both are rigidly secured to the jaw base.

A pair of interconnected, substantially parallel and relatively movable plates are secured, respectively, to the inner ends of the jaw base and the key member to act as dust shields between these members and the chuck body.

Detailed Description

The power chuck 10 (FIGURE 1) includes three chuck jaw assemblies 11 (FIGURES 2, 3 and 5) each of which may embody the preferred form of the invention. Each jaw assembly 11 is comprised of a jaw base 12, which is radially slidably disposed within the chuck body 13 (FIGURE 1) for radial movement with respect thereto in any conventional manner. A top jaw 14 is supported upon each jaw base 12 and interconnected therewith by means including a key member 15.

The jaw base 12 (FIGURES 2, 3 and 5) includes a pair of parallel and integral rails or flanges 18 and 19 which project from, and extend along, opposite sides of said base intermediate top and bottom edges thereof. Said rails are slidably receivable into grooves 22 and 23, respectively, (FIGURES 1 and 5) in the chuck body 13 for restricting the movement of the jaw base 12 to radial movement with respect to said chuck body. A T-shaped member 24 (FIGURES 4 and 5) having an inwardly and upwardly sloping flange 26, is secured to (usually integral with) and extends inwardly from the inner end of the jaw base 12 for engagement in a substantially conventional manner by power actuated means, not shown, for effecting said radial movement of the jaw base 12 with respect to the chuck body 13.

The jaw base 12 has a pair of spaced, integral and substantially parallel wall members 27 and 28 which project upwardly and, in this particular embodiment, have upper edges 29 and 30 lying substantially within a plane parallel with the axial end surface 33 of the chuck body 13, when said jaw base 12 is supported in said chuck body. The wall members 27 and 28 have in their opposing faces parallel grooves 34 and 35, respectively, which are preferably spaced equidistantly from and parallel with the upper edges 29 and 30, respectively. Thus, the grooves 34 and 35 create a pair of ridges 37 and 38 which project inwardly toward each other from said wall members 27 and 28, respectively, adjacent said upper edges 29 and 30.

The wall members 27 and 28 (FIGURE 3) define between them a channel 39 into which the grooves 34 and 35 open adjacent the bottom wall 42 of said channel. An elongated recess 43 is provided in, and extends lengthwise of, the bottom wall 42, and the wall of said recess 43 defines a portion of a cylinder which extends through an arc of between 180 and 270 degrees. A portion 44 (FIGURE 2) of the wall defining the recess 43 is threaded for threaded engagement by a screw 46 disposed within said recess.

The key member 15 (FIGURE 3) has a pair of parallel, sidewardly projecting rails 47 and 48 on opposite sides thereof which are snugly and slidably receivable into the grooves 34 and 35, respectively, at the same time. The key member 15 has a pair of spaced abutments 51 and 52 (FIGURE 2) which extend downwardly into the recess 43 when the rails 47 and 48 are disposed within the grooves 34 and 35. The screw 46 is snugly and rotatably disposed between the abutments 51 and 52 for threaded engagement with the threads 44 in the wall of the recess 43, while the upper surface of said screw 46 slidably engages the bottom wall 53a of the key member 15 between the abutments 51 and 52.

The key member 15 (FIGURE 2) includes an upwardly projecting, lock element 54 which extends substantially above the plane defined by the upper edges 29 and 30 (FIGURE 3) of the wall members 27 and 28. The upper surfaces 56 and 56a on opposite sides of the lock element 54 (FIGURE 2) are spaced downwardly from said upper edges 29 and 30.

The screw 46 (FIGURE 6) has a coaxial, wrench socket 57 in the axial end thereof adjacent the abutment 52. An access opening 58 extends through the abutment 52 in axial alignment with the socket 57 for the reception of a wrench 60 to engage the socket 57 and thereby rotate the screw 46.

The screw 46 (FIGURE 6) has a detent recess 59 in its peripheral, threaded surface between the ends thereof. The key member 15 has a vertical opening 62 (FIGURE 2) with a bottom portion 63 of reduced diameter in which a detent ball 64 is slidably disposed for partial reception into the detent recess of the screw 46 when said screw is in the proper rotational position. A screw 66 is threadedly disposed within the upper, threaded end of the opening 62 and a spring 67 is held under compression by the screw 66 between it and the ball 64 whereby said ball is resiliently urged against said screw 46.

A lower dust shield 71 (FIGURE 4) is secured to the inner ends of the wall members 27 and 28 near to and parallel with, but spaced downwardly from, the upper edges 29 and 30 thereof, so that said shield lies substantially within a plane parallel with and adjacent to said axial end surface 33 (FIGURE 1) of the chuck body 13. The dust shield 71 is removably mounted upon said wall members 27 and 28 by the screws 72 and 73, respectively, which slidably extend through openings 75 and 76 (FIGURE 4) in said dust shield 71 and are threadedly received into the threaded openings 77 and 78 in said wall members 27 and 28, respectively. An upper dust shield 81 is slidably disposed in an undercut groove 82 in the upper surface of the lower dust shield 71. One end of the upper dust shield 81 is positioned upon the top surface 56 of the key member 15 on the inner side of the lock element 54 by the pin 83, which extends through said upper shield 81 and into the pin opening 84 in the surface 56. The dust shields 71 and 81 are constructed so that their upper surfaces are both preferably coplanar with each other and the top surface 56a on the outer side of the lock element 54.

The dust shield 71 (FIGURE 2) moves with the jaw base 12 and with respect to the chuck body 13 to cover continuously the opening in the end surface 33 between the inner end of said jaw base 12 and the opposing portion of the chuck body 13. When the key member 15 is moved with respect to the jaw base 12, the dust shield 81 moves with said key member to cover continuously the inner end of the channel 39 between the inner end of the key member 15 and the outer edge of the dust shield 71.

The top jaw 14 (FIGURES 2 and 5) has a stepped upper surface 86 for effecting both inside and outside engagement with a workpiece in a conventional manner. The lower side of said top jaw 14 has a transversely extending notch 87 into which the lock element 54 is snugly and slidably receivable for holding said top jaw against movement with respect to the key member 15 in a direction radially of the chuck body 13. Said top jaw 14 has a downwardly projecting, integral slide 89 which extends lengthwise of said jaw intermediate the lateral edges of the downwardly facing surface 88. Said slide 89 is split by the notch 87 and is snugly and slidably receivable into the upper end of the channel 39 on opposite sides of the lock element 54 for the purpose of positively preventing relative sidewise movement between the top jaw 14 and the jaw base 12. The slide 89 projects downwardly from the lower surface 88 a distance which is slightly less than the distance between the plane of the upper edges 29 and 30, and the top surface 56a of the key member 15 or the uppermost surfaces of the dust shields 71 and 81. Thus, the lower surface of the slide 89 is spaced from the adjacent portions of the key member 15 when both are properly disposed within the channel 39.

The top jaw 14 (FIGURE 2) has a pair of smooth bore bolt openings 92 and 93 which extend downwardly through said top jaw on the inner and outer sides of the notch 87. The bolt openings 92 and 93 are enlarged at their upper ends in a conventional manner to receive the heads of the machine screws 97. The key member 15 has threaded openings 94 and 95 on opposite sides of the lock element 54 for threadedly receiving said machine screws. As shown in FIGURES 2 and 4, the upper dust shield 81 is provided with an opening 98 through which the machine screw 97 can be slidably received. When the machine screws 97 are received into the bolt openings 92 and 93 and threadedly engaged with the threaded openings 94 and 95, the tightening of these bolts will cause the lower surface 88 on the top jaw 14 to tightly engage the upper edges 29 and 30 on the wall members 27 and 28, and will cause the upper edges of the rails 47 and 48 to engage tightly the downwardly facing sides of the ridges 37 and 38. By this action, the ridges 37 and 38 will be gripped snugly between the rails 47 and 48 on the key member 15 and the lower surface 88 on the top jaw 14, whereby both the top jaw 14 and key member 15 will be rigidly held against the movement with respect to the jaw base 12 and/or the chuck body 13.

*Operation*

The chuck jaw assemblies 11 (FIGURES 1 and 2) are placed in operating position by sliding the key member 15 endwise into the channel 39 while rotating the screw 46 by means of the wrench 60, which is inserted through the opening 58 in the abutment 52 and into the socket 57. The dust shield 81 is mounted within the groove 82 in the dust shield 71 after which said dust shields are mounted upon the key member 15 and jaw base 12, respectively. Machine screws 97 are inserted through the bolt openings 92 and 93 and into the threaded openings 94 and 95 to the point where the top jaw 14 is snugly and slidably held upon the jaw base 12. Said top jaw 14 can be precisely located upon said jaw base by means of indices, not shown, which are scribed in corresponding, adjacent portions of the top jaw 14 and the jaw base 12. With the parts thus positioned, the detent ball 64 will be received into the detent recess 59 on the screw 46 in the key member 15.

The top jaw 14 in each jaw assembly 11 can now be moved as desired or required so that they are in the proper positions for engaging the particular workpiece involved. Movement of each top jaw 14 is effected by rotating the screw 46 with the wrench 60 through the same number of revolutions, whereby the concentric relationship of the circle defined by the work engaging surfaces on the top jaws 14 is accurately maintained. Specifically, this is accomplished by counting the clicks which occur each time the ball 64 drops into the recess 59 as the screw 46 is being rotated. Each top jaw 14 is moved with respect to its jaw base 12 until the same number of clicks is heard.

It will be apparent that, by providing various desired numbers of circumferentially aligned, detent recesses 59 around the screw 46 clicking sounds can be produced by partial, such as half or quarter, rotations of the screw 46. In one particular embodiment of the invention, the lead of each screw 46 is such that one revolution thereof moves the key member 15, hence the top jaw 14, one eighth of an inch lengthwise of the jaw base 12. Accordingly, by placing aligned detent recesses 59 at 90 degree intervals around the circumference of the screw 46, movement in the amount of one thirty-second of an inch can be effected between the key member 15 and the jaw base 12 between each click of the ball 64 into a said recess 59.

After each key member 15, hence its top jaw 14, has been placed in the desired position, the machine screws 97 are firmly tightened within the threaded openings 94 and 95 whereby the ridges 37 and 38 in the wall members 27 and 28 are gripped and held between the key member 15 and top jaw 14 to prevent relative movement between the top jaw 14 and the jaw base 12. Thus, the gripping force applied by the top jaw 14 to the workpiece is transferred directly to the jaw base 12 without subjecting the threads on the screws 46 to any material amount of shearing force. The chuck 10 can now be operated in a substantially conventional manner.

When it becomes necessary or desirable to change the location of the top jaws 14 for gripping a workpiece of a different size or shape, such can be accomplished quickly and easily loosening slightly the machine screws 97 and thereafter rotating each screw 46 until the key member 15 and top jaw 14 thereof are moved into their new positions. Thereafter the machine screws 97 are again tightened and the chuck jaw is again ready for operation.

As shown in FIGURE 7, the detent ball 64a, may also be disposed within an opening 101 in the abutment 51a. A spring 67a which is also in the opening 101, urges the ball 64a into detent recess 102 in the adjacent end of the screw 46a for holding the screw in a selected position and for indicating the number of revolutions made by the screw 46 during the adjustment rotation thereof. A plurality of detent recesses 102 may be provided and circularly arranged in the end wall of said screw 46a for accurately detecting parts of a revolution by the screw 46a.

Although a particular preferred embodiment of the invention has been disclosed in detail above for illustrative purposes, it will be understood that variations or modifications of such disclosure, which come within the scope of the appended claims, are fully contemplated.

What is claimed is:
1. A jaw construction for a chuck, comprising:
   a jaw base having an elongated slot opening through one external face thereof, said jaw base having an elongated threaded recess at the inner end of said slot;
   a key member mounted on said jaw base and extending through said slot, said key member being movable longitudinally along said slot;
   screw means threadedly engaging the threads of said recess and connected to said key member so that rotation of said screw means effects longitudinal movement of said key member along said slot;

a jaw mounted on said key member for movement therewith longitudinally of said slot;

cooperating clamping surfaces on said jaw base, said key member and said jaw; and means extending between said jaw and said key member for moving the clamping surfaces of same into and out of engagement with the clamping surfaces on said jaw base whereby said jaw and said key member can be rigidly secured to said jaw base.

2. A jaw construction according to claim 1, in which said clamping surfaces extend laterally with respect to said slot, said clamping surfaces on said key member and said jaw being opposed to each other and disposed on opposite sides of said clamping surfaces on said jaw base.

3. A jaw construction according to claim 2, in which said jaw is of greater width than said slot and has inner clamping surfaces which overlie the external face of said jaw base on opposite lateral sides of said slot;

said slot having a pair of grooves in the opposite sides thereof spaced inwardly from said external face, said key member having a pair of laterally projecting rails received in said grooves and slidable longitudinally therealong, said rails providing said clamping surfaces on said key member.

4. A jaw construction according to claim 1 in which said recess is partially cylindrical and said key member has a pair of longitudinally spaced abutments which are received in said recess and which are movable axially therealong;

said screw means comprising a screw snugly and rotatably disposed between said abutments but being free from threaded connection to said key member whereby rotation of said screw will move same longitudinally along said recesss and thereby move said key member longitudinally.

5. The jaw construction of claim 1 wherein said screw means has a detent recess in a surface thereof and said key member has a spring backed ball supported therein for reception into said recess when said screw means is in a selected rotational position with respect to said key member.

6. The jaw construction of claim 1 including a first plate rigidly secured to said jaw base on the external face thereof and near one longitudinal end of said slot, a portion of said key member being movable along a portion of said first plate; and a second plate slidably supported upon and parallel with said first plate and secured to said key member for movement with said key member and with respect to said first plate.

7. A jaw construction, comprising:

a jaw base including a pair of spaced, substantially parallel wall members having parallel ridges extending along and projecting from the opposing surfaces thereof, said ridges being near to and substantially parallel with the upper edges of their respective wall members;

means defining a threaded, semicylindrical recess in said jaw base between said wall members and adjacent the lower edges thereof, said recess extending through an end of said jaw base;

a key member slidably and snugly disposed between said ridges, said key member having integral slides projecting from the opposite sides thereof beneath said ridges, and having a pair of spaced downwardly projecting stops extendable into said recess;

screw means snugly disposed between said stops and engaged by the threads in said recess, whereby rotation of said screw means effects movement of said key member with respect to said jaw base;

an integral lock element on said key member extending above the upper edges of said wall members;

a jaw mounted on said lock element and slidably supported upon the upper edges of said wall members whereby said ridges are located between said slides and said jaw;

means extending between said jaw and said key member for moving same toward each other for rigidly clamping said ridges between said jaw and the slides on said key member.

References Cited in the file of this patent

UNITED STATES PATENTS

| | | |
|---|---|---|
| 1,628,476 | Sloan | May 10, 1927 |
| 2,687,308 | Highberg | Aug. 24, 1954 |
| 2,777,704 | Sloan | Jan. 15, 1957 |
| 2,917,314 | Ponting | Dec. 15, 1959 |